(12) United States Patent
Kaku et al.

(10) Patent No.: US 8,651,525 B2
(45) Date of Patent: Feb. 18, 2014

(54) UTILITY VEHICLE

(75) Inventors: Hidetoshi Kaku, Lincoln, NE (US); Tyler Furman, Lincoln, NE (US); Brian Butler, Gretna, NE (US); Yoshinori Tsumiyama, Miki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 96 days.

(21) Appl. No.: 13/269,334

(22) Filed: Oct. 7, 2011

(65) Prior Publication Data

US 2013/0088003 A1 Apr. 11, 2013

(51) Int. Cl.
*B60R 22/34* (2006.01)
*B60R 22/18* (2006.01)
*B60R 21/13* (2006.01)

(52) U.S. Cl.
USPC ............................ 280/756; 280/808; 280/807

(58) Field of Classification Search
USPC .............................. 280/807, 756, 801.1, 808; 297/474–478; 242/379.1
See application file for complete search history.

(56) References Cited

U.S. PATENT DOCUMENTS 3,193,327 A * 7/1965 Roe ............................... 297/476
3,288,254 A * 11/1966 Replogle ..................... 188/82.3

FOREIGN PATENT DOCUMENTS

JP 61-024649 2/1986

\* cited by examiner

*Primary Examiner* — Ruth Ilan
(74) *Attorney, Agent, or Firm* — Alleman Hall McCoy Russell & Tuttle LLP

(57) ABSTRACT

A utility vehicle includes a vehicle body, a seat mounted onto the vehicle body, a seat belt configured to be fastened by a person seated on the seat, a retractor for winding in the seat belt, and a retractor mounting device mounted to the vehicle body. The retractor mounting device includes a retractor bracket, and a cover disposed outward relative to the retractor bracket to cover the retractor bracket from an outward direction, and the retractor is mounted to an inner surface of the retractor bracket in the vehicle width direction.

8 Claims, 6 Drawing Sheets

UTILITY VEHICLE

BACKGROUND OF THE INVENTION

1. Field of the Invention

The present invention relates to a utility vehicle including a seat belt fastened by a person seated on a seat, and a retractor for winding in the seat belt.

2. Description of the Related Art

Japanese Laid-Open Patent Application Publication No. Sho. 61-24649 discloses an exemplary conventional utility vehicle. In this utility vehicle, the end portion of the seat belt is coupled to a side member, a cross member, and another member of a vehicle body by means of a mounting device. Therefore, the mounting device is more likely to interfere with a person, i.e., a passenger, getting into and out of the utility vehicle. Under the circumstances, there is a need to position the mounting device so that it will not interfere with the person getting into and out of the utility vehicle.

SUMMARY OF THE INVENTION

A utility vehicle of the present invention comprises a vehicle body, a seat mounted onto the vehicle body, a seat belt configured to be fastened by a person seated on the seat, a retractor for winding in the seat belt, and a retractor mounting device mounted to the vehicle body. The retractor mounting device includes a retractor bracket, and a cover disposed outward relative to the retractor bracket to cover the retractor bracket from an outward direction, and the retractor is mounted to an inner surface of the retractor bracket.

In this configuration, since the retractor is mounted to an inner surface of the retractor bracket and the retractor bracket is covered with the cover from outside, the retractor bracket and the retractor will not interfere with a person (passenger) who is getting into or getting out of the utility vehicle. In addition, when the utility vehicle is driving in the woods or the like, trees, branches, or other foreign objects are less likely to contact the retractor bracket and the retractor.

The above and further objects and features of the invention will more fully be apparent from the foregoing detailed description with reference to accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in a utility vehicle, and a rightward and leftward direction conforms to a vehicle width direction of the utility vehicle. It is assumed that the utility vehicle is in a stopped state on a road surface substantially parallel to a horizontal plane.

Figure 1:
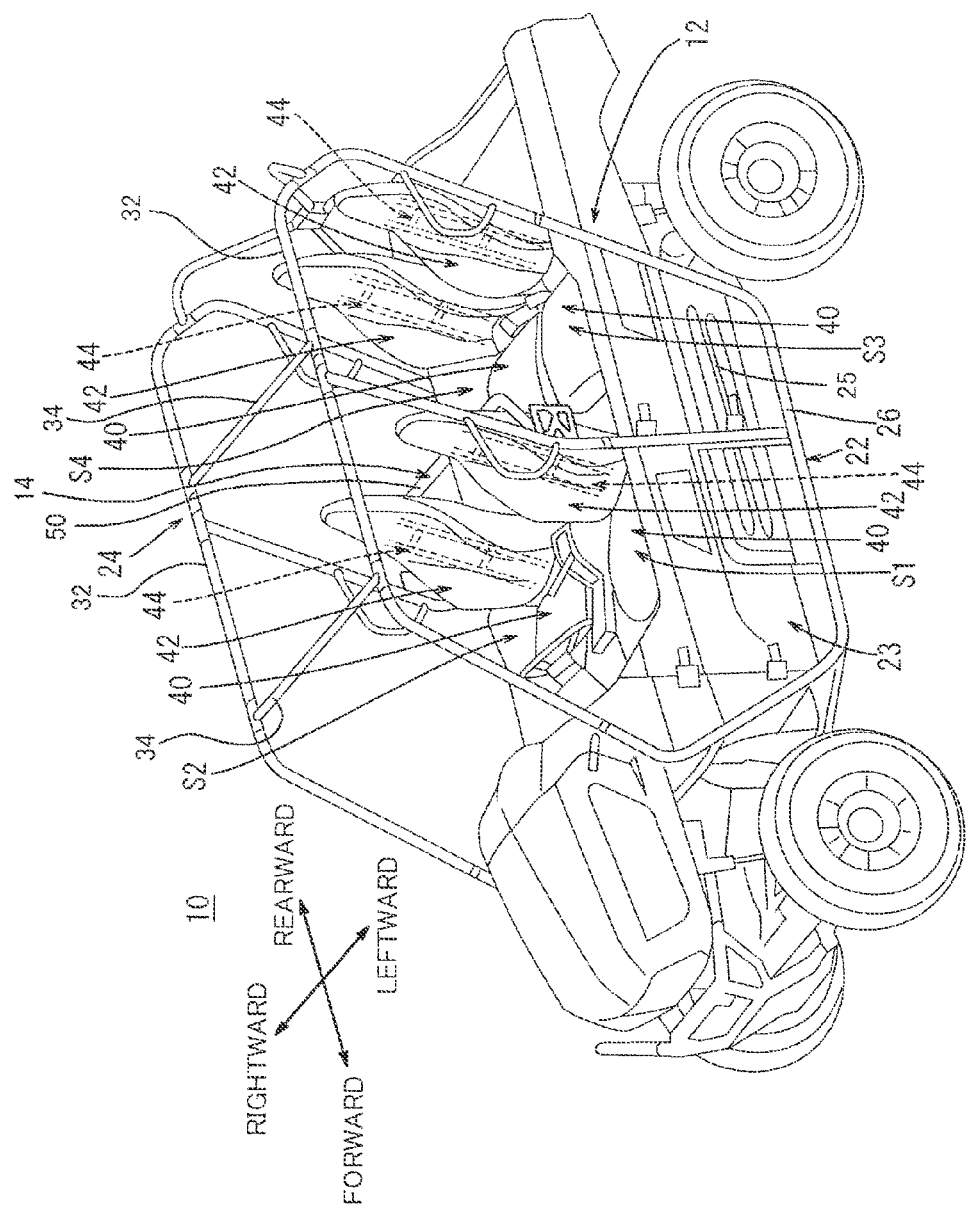
FIG. 1 is a perspective view showing an external appearance of a utility vehicle according to an embodiment.
Figure 2:
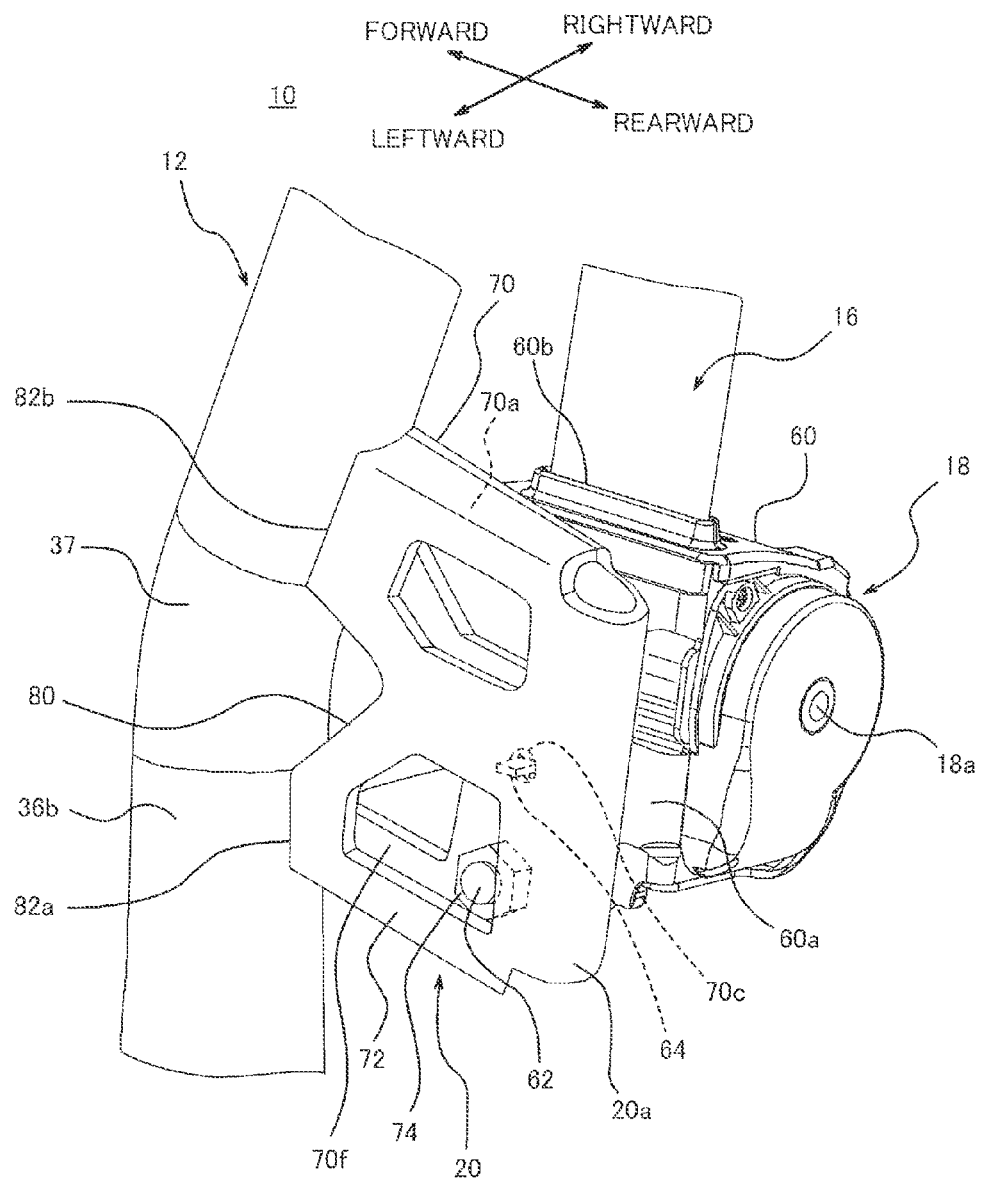
FIG. 2 is a perspective view showing a seat belt, a retractor, and a retractor mounting device.

FIG. 1 is a perspective view showing an external appearance of a utility vehicle 10 according to the embodiment. FIG. 2 is a perspective view showing a seat belt 16, a retractor 18, and a retractor mounting device 20. In FIG. 2, the seat belt 16 is partially shown.

Referring to FIG. 1, the utility vehicle 10 includes a vehicle body 12, four seats S1-S4 mounted onto the vehicle body 12, and a grab bar 14 configured to be grabbed by a person seated on each of the rear seats S3 and S4. In the present embodiment, the front seats S1 and S2 are arranged side by side in a rightward and leftward direction, and the rear seats S3 and S4 are arranged side by side in the rightward and leftward direction, behind the front seats S1 and S2, respectively. The left seat S1 at the front side is a driver seat. Referring to FIG. 2, the utility vehicle 10 includes a seat belt 16 fastened, i.e., secured, by a person seated on each of the front seats S1 and S2 (FIG. 1) to allow the person to be held in the seat S1 or S2, a retractor 18 for winding in the seat belt 16 and a retractor mounting device 20 mounted to the vehicle body 12.

Figure 3:
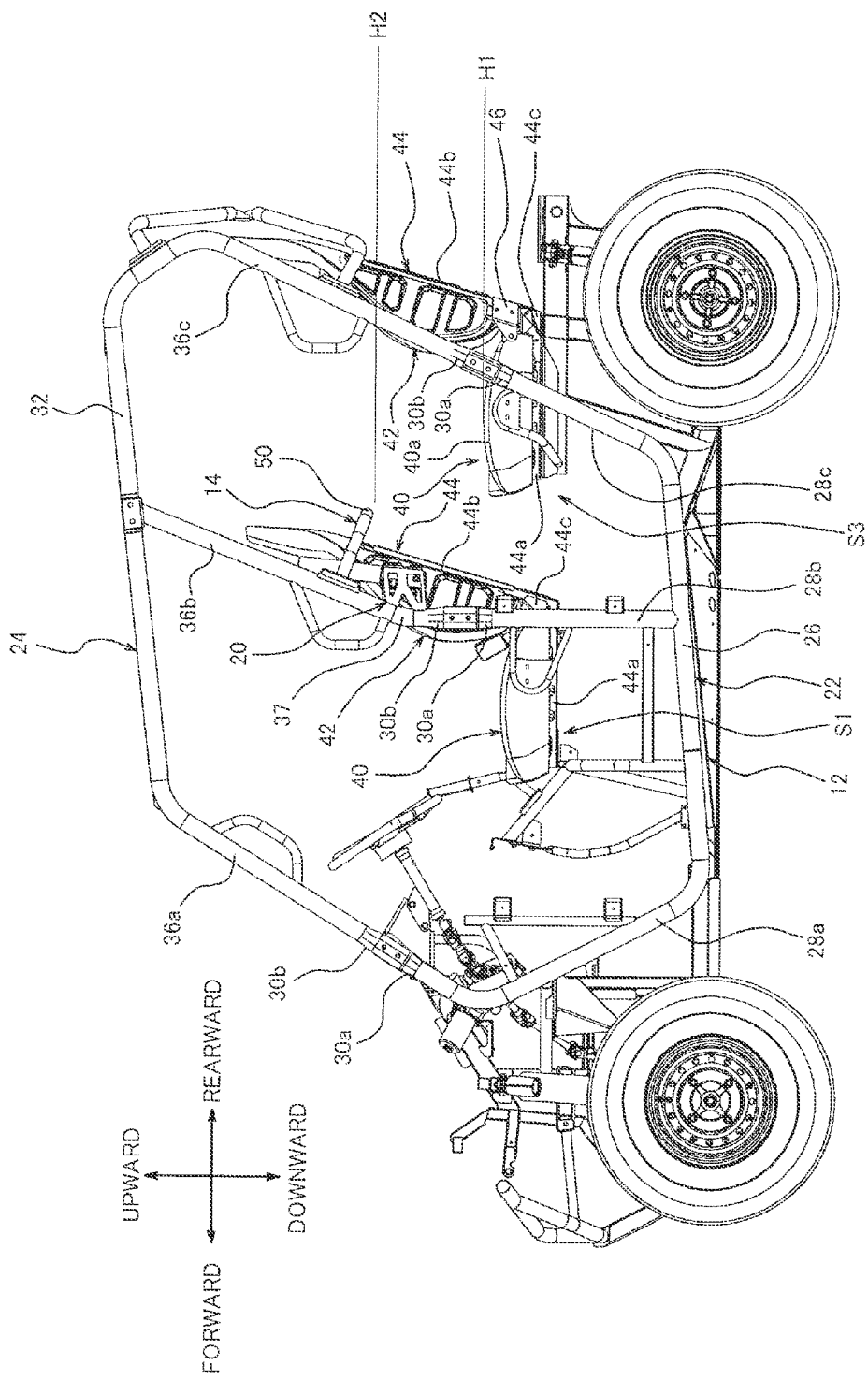
FIG. 3 is a right side view showing a construction of a vehicle body.
Figure 4:
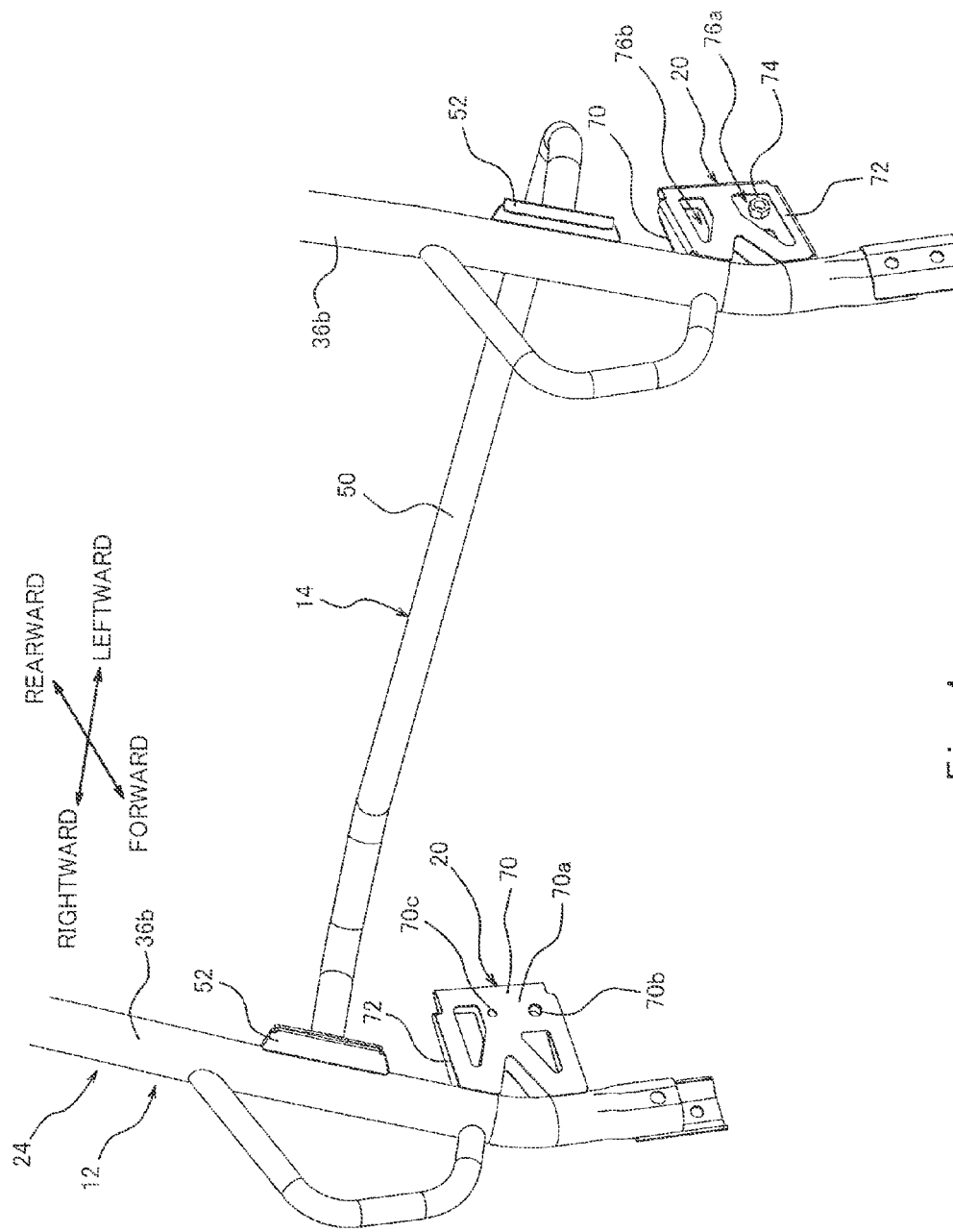
FIG. 4 is a perspective view showing a state where a grab bar and a retractor mounting device are mounted to the vehicle body.

FIG. 3 is a right side view showing a construction of the vehicle body 12. FIG. 4 is a perspective view showing a state where the grab bar 14 and the retractor mounting device 20 are mounted to the vehicle body 12.

As shown in FIG. 1, the vehicle body 12 includes a main frame 22, and a cabin frame (ROPS) 24. The main frame 22 is configured to support an engine (not shown), the four seats S1-S4, front doors 23, rear doors 25, and others. Referring to FIG. 3, the main frame 22 includes a floor member (not shown) facing the road surface or the ground surface, side pipe elements 26 extending in a forward and rearward direction from right and left side portions of the floor member (not shown), respectively, first lower pillar pipe elements 28a extending upward from the front end portions of the side pipe elements 26, respectively, second lower pillar pipe elements 28b extending upward from the center portions of the side pipe elements 26 in the forward and rearward direction, respectively, and third lower pillar pipe elements 28c extending upward from the rear end portions of the side pipe elements 26, respectively. Coupling members 30a are provided at the upper end portions of the lower pillar pipe elements 28a-28c, respectively, and are coupled to coupling members 30b of the cabin frame (ROPS) 24, respectively.

As shown in FIG. 1, the cabin frame (ROPS) 24 includes a pair of right and left side pipe elements 32 opposite to the side pipe elements 26 of the main frame 22, respectively, and a plurality of coupling pipe elements 34 for coupling the side pipe elements 32 to each other. Referring to FIG. 3, the cabin frame (ROPS) 24 further includes first upper pillar pipe elements 36a extending downward from the front end portions of the side pipe elements 32, respectively, second upper pillar pipe elements 36b extending downward from the center portions of the side pipe elements 32 in the forward and rearward direction, respectively, and third upper pillar pipe elements 36c extending downward from the rear end portions of the side pipe elements 32, respectively. Each second upper pillar pipe element 36b has a bent portion 37 bent at a predetermined angle. A portion of the second upper pillar pipe element 36b which is higher than the bent portion 37 is tilted in substantially the same direction that a backrest 42 of each of the seats S1 and S2 (FIG. 1) is tilted. The coupling members 30b are provided at the lower end portions of the upper pillar pipe elements 36a-36b, respectively. The coupling member 30a of the main frame 22 is coupled to the coupling member 30b of the cabin frame (ROPS) 24 by means of bolts and nuts (not shown).

Referring to FIG. 1, each of the seats S1-S4 includes a seat bottom 40 for supporting the hip part of the person, the backrest 42 for supporting the back part of the person, and a seat frame 44 for supporting the seat bottom 40 and the backrest 42. Referring to FIG. 3, the seat frame 44 includes a first support member 44a for supporting the seat bottom 40, a second support member 44b for supporting the backrest 42, and a coupling mechanism 44c for coupling the first support member 44a to the second support member 44b with a predetermined angle. Each of the rear seats S3 and S4 (FIG. 1) is provided with a retractor mounting mechanism 46 by which the retractor 18 (FIG. 2) is mounted to the coupling mechanism 44c of the seat frame 44.

As shown in FIG. 3, in a state where the seats S1-S4 (FIG. 1) are mounted onto the vehicle body 12, the second lower pillar pipe element 28b and the second upper pillar pipe element 36b in the vehicle body 12 are arranged laterally in the vehicle width direction relative to each of the front seats S1 and S2 (FIG. 1), while the third lower pillar pipe element 28c and the third upper pillar pipe element 36c in the vehicle body 12 are disposed laterally in the vehicle width direction relative to each of the rear seats S3 and S4 (FIG. 1).

Referring to FIG. 4, the grab bar 14 includes a grab member 50 to be grabbed by each person seated on the rear seats S3 and S4 (FIG. 1), and two mounting members 52 provided at both end portions of the grab member 50 to mount the grab member 50 to the cabin frame (ROPS) 24. The grab member 50 is a substantially bar-like member extending in the rightward and leftward direction. The right and left end portions of the grab member 50 are bent substantially 90 degrees in a forward direction. The mounting members 52 are substantially plate-like or substantially rod-like members configured to contact the surfaces of the second upper pillar pipe elements 36b, respectively. The mounting members 52 have holes (not shown) into which bolts (not shown) are inserted, respectively. The bolts inserted into the holes are threaded into threaded holes (not shown) of the second upper pillar pipe elements 36b, thereby allowing the grab bar 14 to be mounted to the cabin frame (ROPS) 24.

Referring to FIG. 3, the grab bar 14 is positioned above the seat bottoms 40. When the height of a highest point of a surface 40a (surface for supporting the hip part of the person) of the seat bottom 40 of each of the rear seats S3 and S4 (FIG. 1) is a first height H1, and the height of a lowest point of the grab member 50 of the grab bar 14 is a second height H2, the vertical position of the grab bar 14 is designed so that the second height H2 is larger than the first height H1. This allows each person seated on the rear seats S3 and S4 to easily grab the grab member 50.

Referring to FIG. 2, the seat belt 16 for each of the front seats S1 and S2 (FIG. 1) is a substantially band-like member fastened or secured by each person seated on the front seats S1 and S2 (FIG. 1). In the present embodiment, the seat belt 16 is a general 3-point seat belt including a shoulder belt and a waist belt. As shown in FIG. 2, one end of the seat belt 16 of the driver seat S1 (FIG. 1) is mounted to the retractor 18 provided at the left side of the driver seat S1 (FIG. 1), while the opposite end (not shown) of the seat belt 16 is mounted to the main frame 22 (FIG. 1) or the seat frame 44 (FIG. 1) at the left side of the driver seat S1 (FIG. 1). A tongue plate (not shown) is slidably attached to an intermediate portion of the seat belt 16. When the person seated on the driver seat S1 (FIG. 1) is secured by the seat belt 16 (FIG. 2), the seat belt 16 is pulled out from the retractor 18 (FIG. 2), and the tongue plate (not shown) is inserted into a buckle (not shown) provided at the right side of the driver seat S1.

As the seat belt for each of the rear seats S3 and S4 (FIG. 1), the seat belt 16 (FIG. 2) for each of the front seats S1 and S2 (FIG. 1), a general two-point seat belt, or other suitable seat belt may be used.

Referring to FIG. 2, the retractor 18 includes a retractor body (not shown), a casing 60, a bolt 62 and a projection 64. Although not shown, the retractor body includes a mechanism for winding in the seat belt 16, a mechanism for feeding the seat belt 16 outward according to a pulling force of the seat belt 16, and a mechanism for stopping the outward feed of the seat belt 16 when a rapid pulling force is applied to the seat belt 16. As shown in FIG. 2, a rotational shaft 18a of the retractor body extends in the forward and rearward direction, for example. As shown in FIG. 2, when the retractor 18 of each of the left seats S1 and S3 (FIG. 1) is viewed from behind, the seat belt 16 is wound up, for example, clockwise around the rotational shaft 18a in a radially outward direction. Although not shown, when the retractor 18 of each of the right seats S2 and S4 (FIG. 1) is viewed from behind, the seat belt 16 is wound up, for example, counterclockwise around the rotational shaft 18a in a radially outward direction.

As shown in FIG. 2, the seat belt 16 is stowed into the casing 60 in a state where it is wound up around the retractor body (not shown). An outer surface 60a of the casing 60 in the vehicle width direction is flat to allow the outer surface 60a to contact an inner surface 70a of the retractor mounting device 20 in the vehicle width direction. A slit-like opening 60b, into which the seat belt 16 is inserted, is formed to extend in the forward and rearward direction, in the outer end portion of the upper surface of the casing 60 in the vehicle width direction, including a center portion of the casing 60 in the forward and rearward direction.

As shown in FIG. 2, the bolt 62 is a mounting member by which the casing 60 is mounted to the retractor mounting device 20. The casing 60 has a hole (not shown) into which the bolt 62 is inserted, in a center portion thereof in the forward and rearward direction. The bolt 62 inserted into the hole of the casing 60 protrudes from the outer surface 60a of the casing 60, in a direction perpendicular to the rotational shaft 18a.

As shown in FIG. 2, the projection 64 is engaged with a hole 70c of the retractor bracket 70, to inhibit the casing 60 from rotating around the bolt 62. Projection 64 projects from the outer surface 60a of the casing 60, in the same direction that the bolt 62 protrudes.

Figure 5:
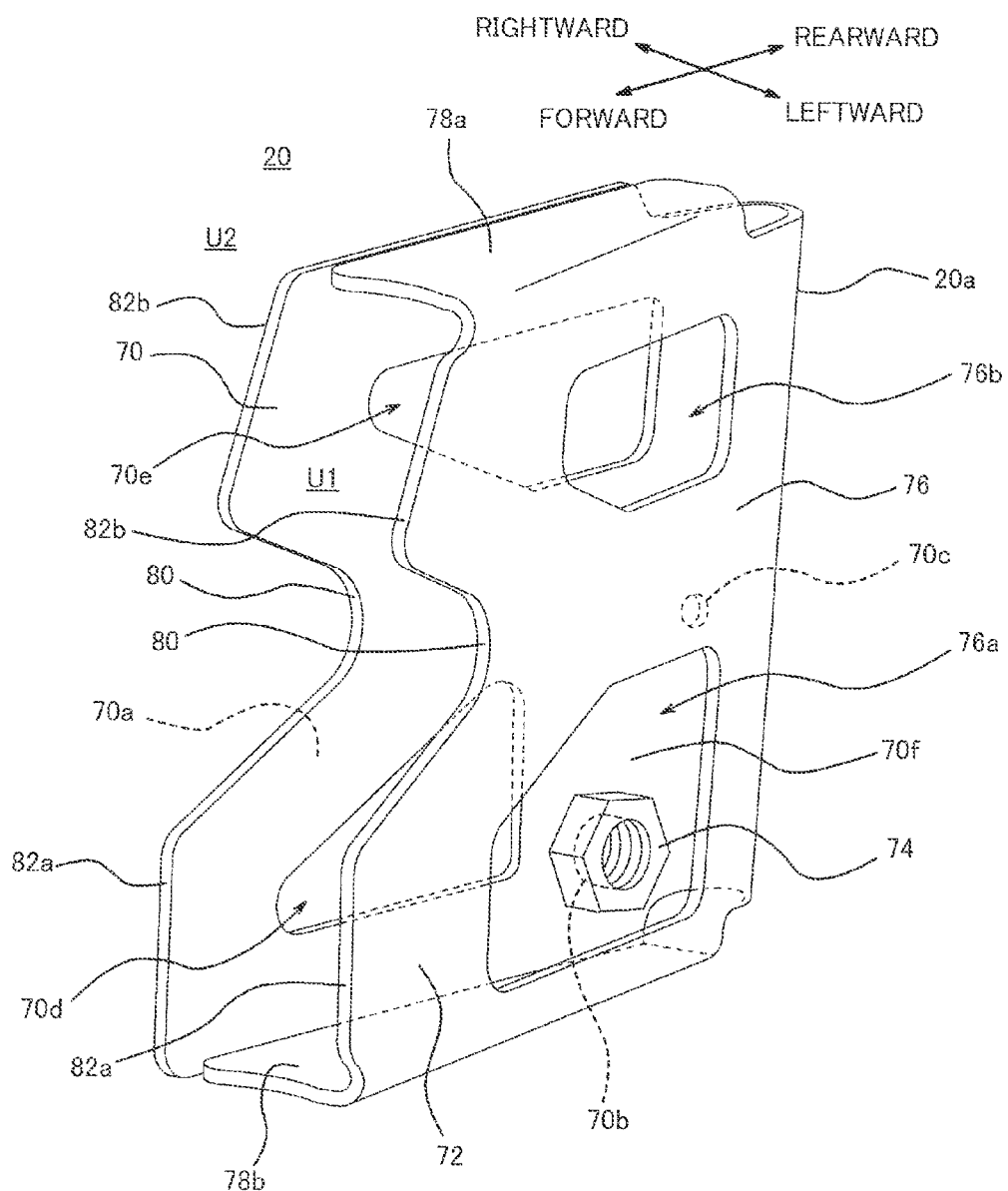
FIG. 5 is a perspective view showing a configuration of the retractor mounting device for use with a left front seat.

FIG. 5 is a perspective view showing a configuration of the retractor mounting device 20 for use with the left front seat S1. A retractor mounting device for use with the right front seat S2 is symmetric with the retractor mounting device 20 for use with the left front seat S1, in the rightward and leftward direction.

As shown in FIG. 2, the retractor mounting device 20 is a device to which the retractor 18 is mounted by means of the bolt 62 and the nut 74, and includes the retractor bracket 70, and a cover 72 disposed outward relative to the retractor bracket 70 in the vehicle width direction to cover the retractor bracket 70 from outward. As shown in FIGS. 2 and 5, in the present embodiment, the retractor mounting device 20 is a device formed by folding a single plate member (not shown) in two at a bent portion 20a to have two plate portions. One of the two plate portions is the retractor bracket 70, and the other is the cover 72. Therefore, it is not necessary to manufacture the retractor bracket 70 and the cover 72 separately. Thus, the retractor mounting device 20 can be manufactured easily.

Referring to FIG. 5, the retractor bracket 70 is a substantially plate-shaped member to which the retractor 18 (FIG. 2) is directly mounted. The retractor bracket 70 has in a lower portion thereof, a hole 70b into which the bolt 62 (FIG. 2) of the retractor 18 is inserted. The retractor bracket 70 has in a vertical center portion thereof, a hole 70c into which the projection 64 (FIG. 2) of the retractor 18 (FIG. 2) is inserted. The retractor bracket 70 has in a lower portion thereof, an opening 70d in a region apart from the hole 70b. The retractor bracket 70 has an opening 70e in an upper portion thereof in a region apart from the hole 70c. The openings 70d and 70e allow an inside space U1 and an outside space U2 of the retractor mounting device 20 to communicate with each other. The nut 74 which is a mounting member is secured by welding or the like to the outer surface 70f of the retractor bracket 70.

As shown in FIG. 5, the cover 72 covers the retractor bracket 70 from outward in the vehicle width direction, and includes a cover body 76, an upper reinforcement portion 78a, and a lower reinforcement portion 78b. The cover body 76 is a substantially plate-shaped portion for covering the retractor bracket 70 from outward in the vehicle width direction. The cover body 76 is disposed to substantially face the retractor bracket 70 in a location apart outward from the retractor bracket 70 in the vehicle width direction. The upper reinforcement portion 78a is a substantially plate-shaped portion for enhancing stiffness of the upper portion of the retractor mounting device 20, and extends inward in the vehicle width direction from the upper edge of the cover body 76. The lower reinforcement portion 78b is a substantially plate-shaped portion for enhancing stiffness of the lower portion of the retractor mounting device 20, and extends inward in the vehicle width direction from the lower edge of the cover body 76.

As shown in FIG. 5, the cover body 76 has, in a lower portion thereof, an opening 76a in a location corresponding to the nut 74. The cover body 76 has, in an upper portion thereof, an opening 76b in at least a portion of a region facing the opening 70e of the retractor bracket 70. Note that the "location corresponding to the nut 74" is meant to include a location from which the nut 74 is easily accessible, in a state where the cover body 76 has the opening 76a, as well as the location corresponding to the nut 74. It may be said that the opening 76a is formed in the "location corresponding to the nut 74," if the nut 74 can be visually checked through the opening 76a, or the nut 74 is grabbed by a hand inserted through the opening 76a. Therefore, regardless of the presence of the cover 72, the nut 74 can be mounted easily to the retractor bracket 70 through the opening 76a. When the retractor mounting device 20 is manufactured, it is not necessary to attach the nut 74 to the single plate member before the single plate member is folded in two. Thus, the retractor mounting device 20 can be manufactured easily.

As shown in FIG. 5, the retractor bracket 70 has a recess 80, a lower securing portion 82a, and an upper securing portion 82b at an end portion thereof at a side opposite to a side where the bent portion 20a is located, while the cover 72 has a recess 80, a lower securing portion 82a, and an upper securing portion 82b at an end portion thereof at a side opposite to a side where the bent portion 20a is located. As shown in FIG. 2, the recesses 80 serve to avoid interference between the bent portion 37 of the second upper pillar pipe element 36b and the retractor mounting device 20. The recesses 80 are formed in the vertical center portion of the retractor bracket 70 and the vertical center portion of the cover 72, respectively, such that they are recessed in a direction away from the bent portion 37. The lower securing portions 82a are formed at the retractor bracket 70 and the cover 72 such that they are located below the recesses 80, respectively. The lower securing portions 82a are secured by welding or the like, to a portion of the second upper pillar pipe element 36b which is below the bent portion 37. The upper securing portions 82b are formed at the retractor bracket 70 and the cover 72 such that they are located above the recesses 80, respectively. The upper securing portions 82b are secured by welding or the like, to a portion of the second upper pillar pipe element 36b which is above the bent portion 37. In a state where the lower securing portions 82a and the upper securing portions 82b are secured to the second upper pillar pipe element 36b, the retractor bracket 70, the cover 72, and the second upper pillar pipe element 36b form a three-dimensional structure of a substantially box-like shape or a substantially tubular shape. This allows the retractor mounting device 20 to have high stiffness.

As shown in FIG. 2, when the retractor 18 is mounted to the retractor mounting device 20, the outer surface 60a of the casing 60 in the retractor 18 in the vehicle width direction is brought into contact with the inner surface 70a of the retractor bracket 70 in the vehicle width direction, and the projection 64 of the retractor 18 is inserted into the hole 70c of the retractor bracket 70. Then, the mounting bolt 62 of the retractor 18 is inserted into the hole (not shown) of the casing 60, and the hole 70b (FIG. 5) of the retractor bracket 70 from inside of the vehicle body, and is threadingly engaged with the nut 74 secured to the outer surface 70f of the retractor bracket 70.

The retractor mounting device 20 is positioned behind the second upper pillar pipe element 36b. Therefore, if the retractor mounting device 20 is provided at an extremely low position, the retractor mounting device 20 and the retractor 18 are more likely to interfere with a leg of the person seated on the rear seat S3 or S4 (FIG. 1). On the other hand, if the retractor mounting device 20 is provided at an extremely high position, the retractor mounting device 20 and the retractor 18 are more likely to contact a hand or the like of the person. To avoid this, as shown in FIG. 3, the retractor mounting device 20 is mounted to the second upper pillar pipe element 36b in a location above the seat bottom 40 of each of the rear seats S3 and S4 (FIG. 1) and below the grab bar 14. When the height of the highest point of the surface 40a (surface for supporting the hip part of the person) of the seat bottom 40 of each of the rear seats S3 and S4 (FIG. 1) is the first height H1, and the height of the lowest point of the grab member 50 of the grab bar 14 is the second height H2, the retractor mounting device 20 is positioned higher than the first height H1 and lower than the second height H2.

Figure 6:
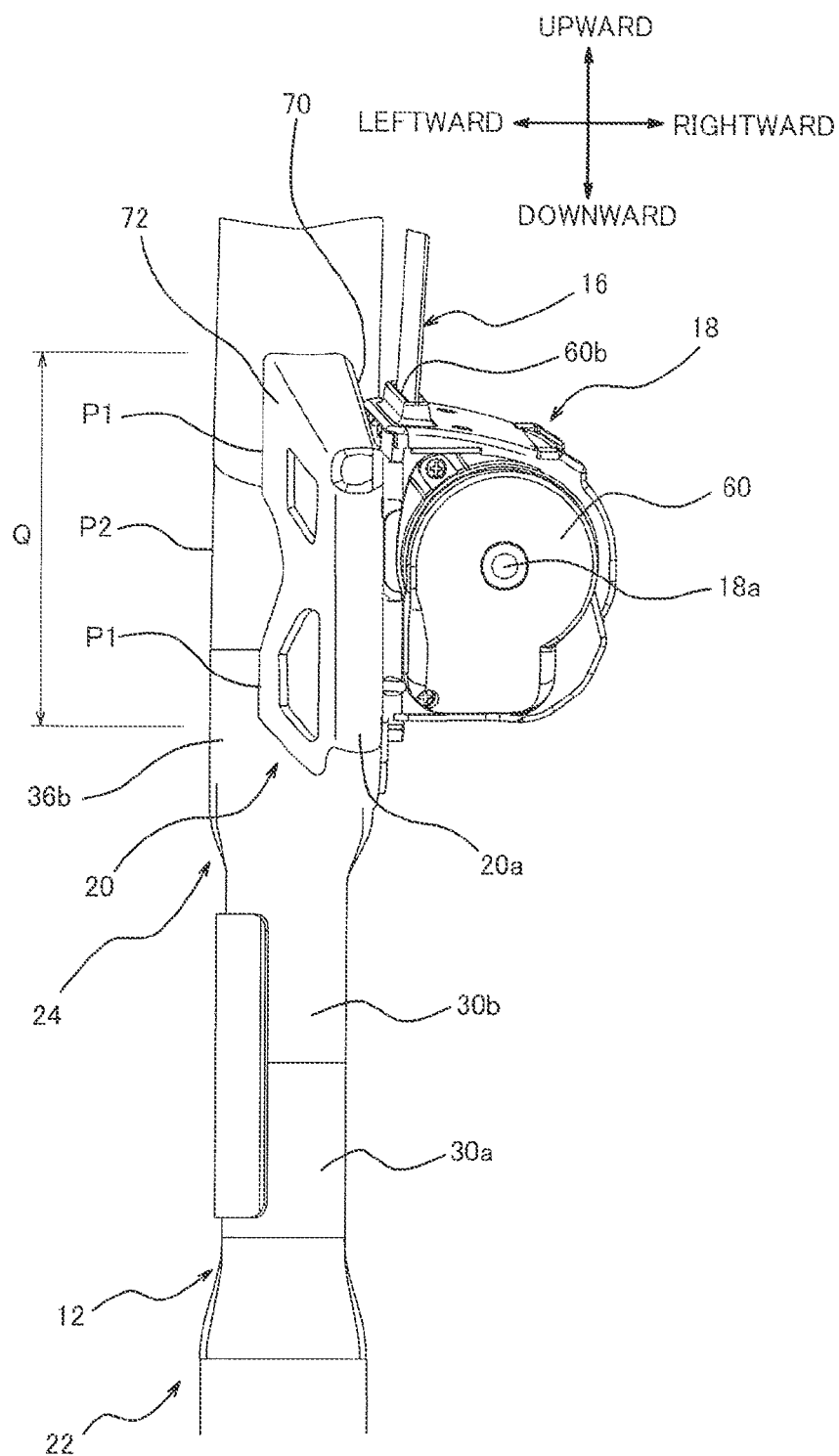
FIG. 6 is a rear view showing a positional relationship between the vehicle body and the retractor mounting device in a rightward and leftward direction.

As shown in FIG. 6, when a portion of the retractor mounting device 20 which is located at an outermost side in the vehicle width direction is a first portion P1 and a portion of the second upper pillar pipe element 36b which is located an outermost side in the vehicle width direction in a region Q of the second upper pillar pipe element 36b to which the retractor mounting device 20 is mounted, the first portion P1 is inward relative to the second portion P2 in the vehicle width direction. In this way, the retractor mounting device 20 is disposed inward relative to the outline of the vehicle body 12 in the vehicle width direction. This allows the utility vehicle 10 to be configured compactly. In addition, since the retractor mounting device 20 does not protrude outward in the vehicle width direction, branches and the like are less likely to contact the retractor bracket 70 and the retractor 18, during driving in the woods, for example.

Turning back to FIG. 2, in a state where the retractor 18 is mounted to the retractor mounting device 20, the slit-like opening 60b of the casing 60 is disposed in close proximity to the retractor mounting device 20. The seat belt 16 is fed outward in an upward direction from a location in close proximity to the retractor mounting device 20. Therefore, even when a rapid pulling force is applied to the seat belt 16, such a force can be received by the retractor mounting device 20 efficiently. In addition, since the projection 64 of the retractor 18 is engaged with the hole 70c, the casing 60 is inhibited from rotating around the bolt 62.

As shown in FIG. 3, when the front seat S1, the retractor mounting device 20 and the retractor 18 (FIG. 2) are viewed from the side in the vehicle width direction, the retractor mounting device 20 and the retractor 18 (FIG. 2) are disposed within a region defined by the outline of the backrest 42, i.e., a thickness of the backrest 42. Because of this structure, the retractor mounting device 20 and the retractor 18 (FIG. 2) do not protrude rearward from the backrest 42, and therefore will not interfere with the person getting into or getting out of the utility vehicle 10. Furthermore, as shown in FIG. 2, since the retractor bracket 70, the nut 74 and the retractor 18 are covered with the cover 72 from outward in the vehicle width direction, they will not interfere with the person getting into or getting out of the utility vehicle 10.

As shown in FIG. 2, in the present embodiment, the projection 64 of the retractor 18 is engaged into the hole 70c formed in the retractor bracket 70 to inhibit the casing 60 from rotating around the bolt 62. Alternatively, a projection (not shown) of the retractor bracket 70 may be engaged into a hole (not shown) formed in the retractor 18 to inhibit the casing 60 from rotating. In a further alternative, instead of the hole into which the projection is inserted, the retractor bracket 70 or the retractor 18 may be provided with a recess into which the projection is fitted.

As shown in FIG. 5, although in the present embodiment, the nut 74 which is the mounting member is secured to the retractor bracket 70 by welding or the like, the nut 74 need not alternatively be secured to the retractor bracket 70. In other words, the retractor bracket 70 and the retractor 18 may be fastened together using a general method, for example, by threading a bolt into a nut. In a further alternative, another mounting member may be used as the nut 74. For example, when the retractor bracket 70 and the retractor 18 are coupled together by a fitting structure of the retractor bracket 70 and the retractor 18, a portion of the fitting structure as the "mounting member" may be mounted to the outer surface 70f of the retractor bracket 70. Moreover, a bolt which is the mounting member may be attached to the outer surface 70f of the retractor bracket 70 and a nut with which the bolt is threadingly engaged may be attached to the retractor 18.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body;
a seat mounted onto the vehicle body;
a seat belt configured to be fastened by a person seated on the seat;
a retractor for winding in the seat belt; and
a retractor mounting device mounted to the vehicle body;
wherein the retractor mounting device includes a retractor bracket, and a cover disposed outward relative to the retractor bracket to cover the retractor bracket from an outward direction;
wherein the retractor is mounted to an inner surface of the retractor bracket in a vehicle width direction of the vehicle body, and the cover is disposed outward relative to the retractor bracket in the vehicle width direction of the vehicle body;
wherein the retractor mounting device is a device formed by folding a single plate member in two at a bent portion to have two plate portions; and
wherein one of the two plate portions is the refractor bracket and the other is the cover.

2. The utility vehicle according to claim 1, wherein an end portion of the retractor bracket which is at a side opposite to the bent portion is secured to the vehicle body, and an end portion of the cover which is at a side opposite to the bent portion is secured to the vehicle body.

3. The utility vehicle according to claim 2, further comprising a mounting member mounted to an outer surface of the retractor bracket, wherein the refractor is mounted to the refractor bracket by the mounting member.

4. The utility vehicle according to claim 3, wherein the cover has an opening provided in a location corresponding to the mounting member.

5. The utility vehicle according to claim 3, wherein one of the retractor and the refractor bracket has a projection, and the other of the refractor and the retractor bracket has a hole or a recess into which the projection is engageable.

6. A utility vehicle comprising:
a vehicle body;
a seat mounted onto the vehicle body;
a seat belt configured to be fastened by a person seated on the seat;
a retractor for winding in the seat belt; and
a retractor mounting device mounted to the vehicle body;
wherein the retractor mounting device includes a retractor bracket, and a cover disposed outward relative to the retractor bracket to cover the retractor bracket from an outward direction; and
wherein the retractor is mounted to an inner surface of the retractor bracket in a vehicle width direction of the vehicle body, and the cover is disposed outward relative to the retractor bracket in the vehicle width direction of the vehicle body, the utility vehicle further comprising:
a front seat;
a rear seat disposed behind the front seat and having a seat bottom; and
a grab bar configured to be grabbed by a person seated on the rear seat,
wherein:
the vehicle body has a pillar pipe element disposed laterally in the vehicle width direction relative to the front seat;
the grab bar is disposed above the seat bottom; and
the retractor mounting device is mounted to the pillar pipe element in a location above the seat bottom and below the grab bar.

7. The utility vehicle according to claim 6,
wherein the front seat includes a backrest, and when the front seat, the retractor mounting device and the retractor are viewed laterally in the vehicle width direction, the retractor mounting device and the retractor are positioned within a region defined by an outline of the backrest.

8. The utility vehicle according to claim 6, wherein an outermost end portion of the retractor mounting device in the vehicle width direction is disposed inward relative to an outermost portion of a region of the pillar pipe element to which the refractor mounting device is mounted, in the vehicle width direction.

* * * * *